(12) United States Patent
Van De Voorde et al.

(10) Patent No.: US 6,239,887 B1
(45) Date of Patent: May 29, 2001

(54) METHOD TO DETERMINE A SWITCHING MOMENT AND A LINE TERMINATOR, A CONTROL NETWORK UNIT AND A NETWORK UNIT REALIZING SUCH A METHOD AND A TREE-LIKE OPTICAL NETWORK INCLUDING SUCH A LINE TERMINATOR, SUCH A CONTROL NETWORK UNIT OR SUCH A NETWORK UNIT

(75) Inventors: Ingrid Zulma Benoit Van De Voorde, Wolvertem; Peter Johannes Vetter, Antwerp; Claire Martin, Ukkel; Hans Slabbinck, Gent, all of (BE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/401,125

(22) Filed: Sep. 22, 1999

(30) Foreign Application Priority Data

Sep. 23, 1998 (EP) .................................................. 98402330

(51) Int. Cl.⁷ .............................. H04B 10/08; H04J 14/00
(52) U.S. Cl. ............................ 359/110; 359/117; 370/351
(58) Field of Search ................................... 359/139, 157, 359/110, 117; 370/351

(56) References Cited

U.S. PATENT DOCUMENTS

| 5,453,988 | 9/1995 | Clarke ................................ 359/110 |
| 5,526,488 | * 6/1996 | Hershey et al. ................... 395/200.2 |
| 5,646,758 | * 7/1997 | Miki et al. ............................ 359/137 |
| 5,706,111 | * 1/1998 | Morales et al. ....................... 359/125 |
| 5,754,319 | * 5/1998 | Van De Voorde et al. ......... 359/109 |
| 5,815,295 | * 9/1998 | Darcie et al. ......................... 359/128 |

FOREIGN PATENT DOCUMENTS

| 42 33 581 A1 | 4/1994 | (DE) . |
| 0 765 045 A1 | 3/1997 | (EP) . |

\* cited by examiner

*Primary Examiner*—Leslie Pascal
*Assistant Examiner*—Vu Lieu
(74) *Attorney, Agent, or Firm*—Sughrue, Mion, Zinn, Macpeak & Seas, PLLC

(57) ABSTRACT

A method to determine a switching moment (Ti) of a switch (SWi) is provided. The switch is coupled to an optical combiner (OC) of a tree-like optical network. The optical combiner enables multiple access of information signals (IN1, ..., INi, ... INn) which are upstream transmitted from network units (NU1, NU1', NU1", ..., NUi, ..., NUn) to a line terminator (LT) via the cascade connection of dedicated branches (B1, ..., Bi, ..., Bn), the optical combiner and a common branch (BC). The switch passes an information signal (INi) at an approximated switching moment (APP-Ti) when the information signal is present and interrupts the branch when the information signal is not present. The method includes the steps of: a) capturing downstream grant information by a control network unit (CTRL-NU) which is coupled between the switch and the line terminator; and b) determining the approximated switching moment by the control network unit based upon the downstream grant information; and c) upstream transmitting by one of the network units coupled to this one dedicated branch a predefined bit pattern (PAT) similar to the information signal. In the event when the predefined bit pattern is passing through the switch, the predefined bit pattern is truncated and a truncated bit pattern (PAT-TR) is provided which is related to the approximated switching moment; and d) detecting by the line terminator reception of the truncated bit pattern; and e) determining by the line terminator a measure of how much the predefined bit pattern is truncated and providing thereby a truncation measure (TR); and f) calculating in function of the truncation measure a calibration value (CAL-SWi) for the switching moment; g) providing the calibration value to the control network unit in order to determine the switching moment in function of the calibration value and the approximated switching moment.

10 Claims, 1 Drawing Sheet

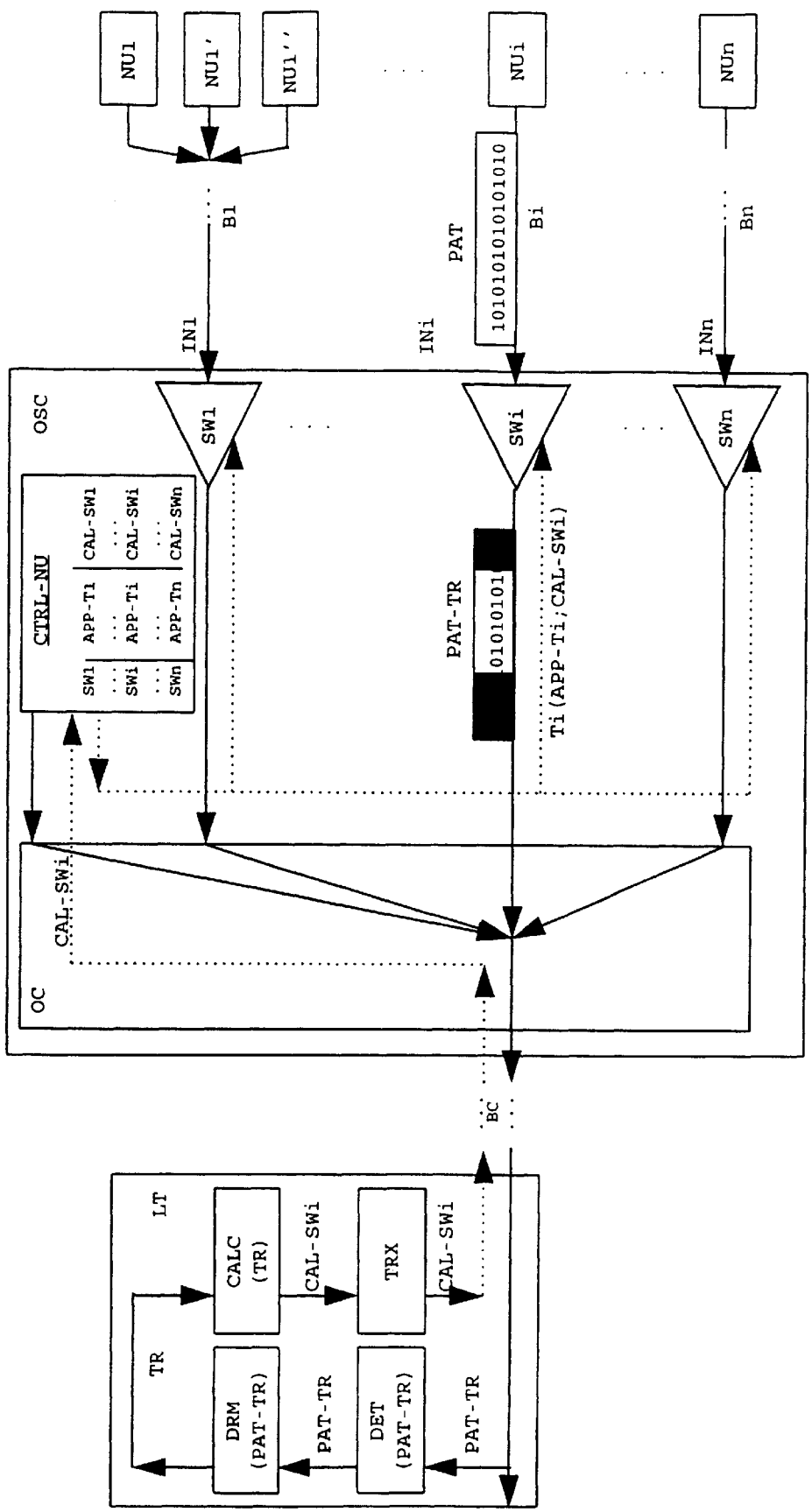
Figure

METHOD TO DETERMINE A SWITCHING MOMENT AND A LINE TERMINATOR, A CONTROL NETWORK UNIT AND A NETWORK UNIT REALIZING SUCH A METHOD AND A TREE-LIKE OPTICAL NETWORK INCLUDING SUCH A LINE TERMINATOR, SUCH A CONTROL NETWORK UNIT OR SUCH A NETWORK UNIT

BACKGROUND OF THE INVENTION

The present invention relates to a method to determine a predefined switching moment of a switch as and a line terminator, a control network unit and a network unit realizing such a method and a tree-like optical network including such a line terminator, such a control means or such a network unit.

Such a line terminator, a control network unit and such a network unit are already known in the art, e.g. from "the published European patent application, published at 26.03.1997, with the title "Arrangement for amplifying and combining optical signals, and method for upstream transmission realized therewith", with publication number EP 0 765 045 A1". Therein, an optical amplifier combiner arrangement is described in a tree-like optical network. The tree-like optical network consists of the cascade connection of dedicated branches, the combiner arrangement and a common branch. The arrangement is coupled between a plurality of optical network units and an optical line terminator via one of the dedicated branches and the common branch respectively. The tree-like optical network enables upstream transmission of information signals from the optical network units to the optical line terminator. The optical amplifier combiner arrangement includes for each branch of the dedicated branches an optical amplifier to amplify an upstream information signal with a gain value and to thereby generate an amplified information signal with a predetermined power level;

an optical switch on/off coupled between the optical amplifier and an optical combiner to pass the amplified information signal when the information signal is present and to interrupt the branch when the information signal is not present.

The optical combiner is included in the arrangement to combine all amplified information signals according to a multiple access technique for application to the optical line terminator.

In order to explain the object of the invention a possible way of determining the switching moment of each switch is explained in this further paragraph. The above mentioned document describes in column 2 from line 11 to line 25 a network which uses for the upstream transmission a time division multiple access technique. This technique makes use of special grant information in order to indicate to a network unit the application of an upstream timeslot. When a network unit receives from the line terminator a grant, it will wait for a certain delay before transmitting an upstream information signal. These delays are determined during a so called ranging procedure whereby an identical virtual distance is introduced for each network unit. This ranging procedure assures that when looking to the multiple access principle, each information signal transmitted by the different network units, arrives at the optical combiner in order to use the common branch, the one after the other following its dedicated timeslot. When each network unit introduces a correct delay there will be no collision at the optical combiner between the upstream information signals.

Just before being combined, each information signal has passed the switch of its dedicated branch. The switch passed the information signal when it was present and interrupted the branch afterwards when the information signal was not present anymore.

The control of the switches is realized by a) capturing downstream grant information by a control network unit which is coupled between the line terminator and the switch; and b) determining the approximated switching moment by the control network unit based upon the downstream grant information.

With this special grant information the moment of transmitting upstream information for each network unit of each branch is determined and, associated therewith, also the moment of switching on and off for each switch of each dedicated branch in order to pass the transmitted upstream information.

However, due to the difference in distance of the control network terminator to the combiner and the different switches to the combiner, an uncertainty on the switching moment remains. Indeed, the control optical network terminator is enabled by capturing the special grant information to determine the moment when the information signal arrives at the combiner but the moment when the information signal arrives at the switch i.e. the switching moment of the switch is with this method only approximated due to this difference in optical delay and electrical delay.

SUMMARY OF THE INVENTION

An object of the present invention is to provide a method to determine a switching moment of a switch such as the above known method but which has not the above drawback, i.e. a method which determines a switching moment with a better accuracy.

According to the invention, this object is achieved by means of the method to determine a switching moment as described in claim 1, and by means of the line terminator, the control network unit and the network unit which are realizing this method as described in claim 4, claim 6 and claim 8, respectively and the tree-like optical network including such a line terminator, such a control means and such a network unit as described in claim 10.

Indeed, the present invention addresses this problem by:

c) upstream transmitting by one of the plurality of network units coupled to the dedicated branch a predefined bit pattern similar to the information signal, and when the predefined bit pattern is passing through the switch, thereby truncating the predefined bit pattern and providing a truncated bit pattern related to the approximated switching moment; and d) detecting by the line terminator reception of the truncated bit pattern; and e) determining by the line terminator upon reception of the truncated bit pattern a measure of how much the predefined bit pattern is truncated and providing thereby a truncation measure; and f) calculating in function of the truncation measure a calibration value for the approximated switching moment; and g) providing the calibration value to the control network unit in order to determine the switching moment in function of the calibration value and the approximated switching moment.

It has to be remarked that the transmission of a predefined bit pattern can be executed at predefined regular moments which are known by the different network units and by the line terminator. However, another way of initiating the step of upstream transmitting of a predefined bit pattern by a network unit is upon receiving from the line terminator a calibration control signal e.g. a specific grant downstream transmitted in order to give a particular network unit the permission to use an upstream timeslot for the transmission of the predefined bit pattern. This is described in the method of claim 2, the line terminator of claim 5 and the network unit of claim 9.

A possible way to determine by the line terminator a measure of how much the predefined bit pattern is truncated is e.g. determining the length of the truncated bit pattern and comparing this length with a predefined length of the predefined bit pattern. However another implementation of the present invention is described in claim 3. Indeed, by:

determining by the line terminator upon detection of the truncated bit pattern a receiving time of the truncated bit pattern; and defining a receiving time reference by determining the receiving time of the truncated bit pattern at the line terminator in the event when the switch is continuously open whereby the truncated bit pattern substantially equals to the predefined bit pattern; and that the calibration value is calculated in function of the receiving time and the receiving time reference.

A further possible implementation is described in claim 7. Indeed, a possible way to realize the control network unit is according to a distributed way. This means that each switch has its own control network unit which must be able to perform the requested functions e.g. capturing grant information and determining the switching moment of its associated switch according to the received calibration value and the approximated switching moment. However, in order to save hardware and according to the control network unit of claim 7, the control network unit is centralized for each switch of each dedicated branch. Such a control network unit is coupled between each one of the plurality of switches similar to the switch and the optical combiner.

BRIEF DESCRIPTION OF THE DRAWINGS

The above and other objects and features of the invention will become more apparent and the invention itself will be best understood by referring to the following description of an embodiment taken in conjunction with the accompanying FIGURE which represents a tree-like optical network.

DETAILED DESCRIPTION OF THE INVENTION

First, the working of the method of the present invention will be explained by means of a functional description of the functional blocks shown in the FIGURE. Based on this description, implementation of the functional blocks will be obvious to a person skilled in the art and will therefor not be described in further detail. In addition, the principle working of the method to determine a switching moment will be described.

Referring to the FIGURE, the tree-like optical network includes a line terminator LT, an optical splitter-combiner OSC and a plurality of network units NU1, NU1', NU1", ... NUi, ..., NUn. The plurality of network units is coupled to the line terminator LT via the cascade connection of dedicated branches B1, ..., Bi, ..., Bn the optical splitter-combiner and a common branch BC.

The downstream transmission path is starting at the line terminator LT and is passing via a downstream common branch included in the common branch BC, the optical splitter-combiner and is furthermore distributed via optical branches B1, ..., Bi, ..., Bn to the network units NU1, NU1', NU1", ..., NUi, ..., NUn. It has to be remarked that only the downstream path from the line terminator LT to a special control network unit CTRL-NU included in the optical splitter-combiner OSC is shown in the FIGURE. A further remark is that the downstream common branch includes one or more optical amplifiers e.g. Erbium Doped Fibre Amplifiers and that also the optical splitter-combiner OSC includes after the splitting point an optical amplifier e.g. Erbium Doped Fibre Amplifier before each output of the optical splitter-combiner OSC towards each branch Bi. However these optical amplifiers are not shown either in order not to overload the FIGURE.

Each upstream transmission path is starting at one of the network units NUi and is passing via a wavelength division multiplexer (not shown) and via one of the dedicated branches Bi in order to be time division multiplexed i.e. combined by the optical combiner-splitter OSC and is furthermore passing via an upstream common branch included in the common branch BC up to the line terminator LT. It has to be remarked that more than one network unit might be coupled to one upstream input of the optical splitter-combiner OSC e.g. a total passive optical network PON might be coupled to one upstream input of the optical splitter-combiner. Indeed, as it is shown in the FIGURE NU1, NU1' and NU1" are coupled to the same branch B1. A further remark is that although different network units are coupled to one branch e.g. B1, only one calibration has to be executed for the switch S1 of this branch B1. This means that in the event when a plurality of network units is coupled to a same branch, the method of the invention has to be executed only once in order to determine a switching moment of its switch. Furthermore, the upstream transmission path includes also, just before the combining point for each branch Bi an optical amplifier. These optical amplifiers are implemented by semiconductor optical amplifiers (SOA's) and will be discussed in a further paragraph.

According to the above mentioned prior art document, the tree-like optical network makes use for the upstream transmission of a time division multiple access technique. This technique uses grant information in order to indicate to a network unit NUi the application of an upstream timeslot. When a network unit e.g. NUi receives from the line terminator LT via the downstream transmission path a grant i.e. a downstream distributed signal which includes the identity of the network unit NUi, this network unit NUi will wait for a predefined delay before transmitting an upstream information signal. These delays are determined during a so called ranging procedure whereby an identical virtual distance is introduced for each network unit. This ranging procedure assures that according to the time division multiple access principle, each information signal transmitted by one of the optical network units NUi, arrives at the optical splitter-combiner OSC the one after the other according to its dedicated timeslot.

According to the FIGURE, the optical combiner-splitter OSC includes an optical splitter (not shown) which is used for the downstream transmission in order to distribute the downstream transmitted signals, an optical combiner OC which is used for the upstream transmission in order to combine the upstream transmitted signals, the above mentioned control network unit CTRL-NU and as mentioned above, for each incoming branch Bi a semiconductor optical amplifier which includes a switch SWi. It has to be remarked that for this particular embodiment the switch SWi is integrated in the semiconductor optical amplifier of its branch Bi. This is shown in the FIGURE wherein for each branch Bi a sign for an amplifier includes the reference to the dedicated switch SWi. It has to be remarked that the method to determine a predefined switching moment according to the present invention is not limited to such an implementation of integration of these two functionality's in one semiconductor. Indeed, as it is described in the mentioned prior art document, the switch could be implemented as a stand-alone functional block coupled between the optical amplifier of its branch and the optical combiner OC.

The plurality of switches SW1, ..., SWi, ..., SWn are downstream coupled to the plurality of network units NU1, NU1', NU1", ..., NUi, ..., NUn and are upstream coupled to the optical combiner OC. The optical combiner OC is upstream coupled to the line terminator LT.

As it is explained in the prior art document, for each branch B1, ..., Bi, ..., Bn an optical switch SW1, ..., SWi, ..., SWn is included in order to pass an amplified information signal when the information signal is present and in order to interrupt the branch when the information signal is not present. According to this way, accumulation of ASE amplified spontaneous emission noise is avoided.

A possible way to determine an approximation of each switching moment of each switch SWi is by making use of the centralized control network unit CTRL-NU. The above mentioned prior art describes other ways of determining an approximation of the switching moments of the switches SWi, however for this particular embodiment the implementation of the centralized control network unit is preferred.

The control network unit CTRL-NU is coupled to each switch SWi of each branch Bi in order to control the switching moment of these switches. An approximated switching moment for each switch SWi is determined by the control network unit CTRL-NU by capturing the downstream distributed grant information. Indeed, according to this way the control network unit CTRL-NU is aware when a predefined network unit NUi is permitted to transmit an upstream information packet in order to use an upstream timeslot on the common branch BC. Since the control network unit CTRL-NU is also ranged to a predefined virtual distance, just like the other network units NUi, an approximation of when the upstream information packet from the network unit NUi arrives at the optical combiner is made by the control network unit CTRL-NU. However, due to the difference in distance of the control network terminator CTRL-NU to the combiner OC and the different switches SWi to the combiner OC, an uncertainty remains on the switching moment. Indeed, this optical delay and also electrical delay are providing an uncertainty on the exact switching moment for each switch SWi.

According to the FIGURE, the line terminator LT includes a detector DET, a determiner DRM, a calculator CALC and a transmitter TRX.

The detector DET is coupled to an upstream input of the line terminator LT in order to receive the upstream transmitted signals and in order to detect the possible presence of a predefined truncated bit pattern PAT-TR in the incoming signals. This predefined truncated bit pattern PAT-TR is a predefined bit pattern which is truncated when it was passing through the switch SWi of the branch Bi due to the inaccuracy of the switching moment of the switch SWi. The determiner DRM is coupled to the detector DET and receives from the detector the truncated predefined bit pattern.

The determiner DRM is included in order to determine how much the received truncated bit pattern PAT-TR is truncated. The determiner DRM provides hereby a truncation measure TR. This truncation measure is provided to the calculator CALC which is coupled to the determiner DRM. Although the implementation of the determiner DRM and calculator CALC can be realized in different ways e.g. the length of the original bit pattern PAT comparing with the length of the not truncated part of the truncated bit pattern PAT-TR, it is preferred for this embodiment to work with receiving time moments. According to this implementation, the receiving time of the not truncated part of the truncated bit pattern PAT-TR is determined by the determiner DRM. Furthermore during initialization of each network unit NUi e.g. during ranging procedures a receiving time reference is determined by the determiner DRM for each branch Bi. This is implemented by measuring the receiving time of a bit pattern PAT when the associated switch SWi is continuously open. It is explained that in such a situation the bit pattern PAT is not truncated at all and that the received truncated bit pattern PAT-TR substantially equals to the original transmitted bit pattern PAT. This receiving time reference is stored in a memory (not shown) for each switch SWi.

The calculator CALC calculates in function of the received truncation measure TR a calibration value CAL-SWI for the particular switch SWi. This calibration value CAL-SWi is provided to the transmitter TRX of the line terminator LT. According to the actual implementation the calculator calculates this calibration value in function of the receiving time reference of the switch SWi and the receiving time of the truncated bit pattern provided by the determiner DRM. In fact, the receiving time should, according to the ideal situation, be equal to the time moment which equals to the receiving time reference plus the time period of one timeslot. Therefor the difference between the receiving time and this time moment is calculated in order to determine the calibration value CAL-SWi for the switch SWi.

The transmitter TRX is coupled to a downstream output of the line terminator LT and downstream transmits the calibration value CAL-SWi by including it e.g. in a downstream distributed control signal.

The downstream transmitted calibration value CAL-SWi is captured by the control network unit CTRL-NU. The control network unit CTRL-NU determines a switching moment for the switch SWi with an improved accuracy based upon the approximated switching moment of the switch SWi and the received calibration value CAL-SWi for the switch SWi. This switching moment is provided to the switch SWi which uses this switching moment when the next incoming signal arrives at its branch Bi.

It has to be remarked that although according to this particular embodiment the step of determining the switching moment in function of the approximated switching moment and the calibration value is executed by the control network unit CTRL-NU, the method of the invention is not restricted by this way of implementation. Indeed, as already mentioned above, the optical switch SWi could be integrated in a semiconductor optical amplifier whereby it is enabled to execute also this step by a SOA-controller. In this way the control network unit CTRL-NU provides as well the approximated switching moment APP-Ti as the calibration value CAL-SWi to the SOA-controller which calculates and provides the more accurate switching moment Ti to the switch SWi integrated in the SOA. It has to be remarked that according to this way part of the centralized functionality of the control network unit CTRL-NU is shifted to the different branches i.e. to the different SOA-controllers which are present anyway.

Although the principle working of the invention has become clear by the above description of the functionality's of each functional block included in the line terminator LT, the optical splitter-combiner OSC and the plurality of network units NU1, NU1', NU1", . . . , NUi, . . . , NUn the consecutive steps of the method of the invention will be repeated here shortly. Or even more, in the event that an approximated switching moment is not determined by the control network unit CTRL-NU but e.g. by means of a tap on each branch Bi just before the optical amplifier and a processor which detects the presence of an incoming signal, only the calibration value CAL-SWi is to be provided to the switch SWi.

A downstream signal is distributed by the line terminator LT into the network. Presume that this downstream signal includes a control signal which includes a calibration message "transmitting a predefined bit pattern in order to calibrate the switch of a branch" and furthermore the identity of a network unit for which the calibration message is meant. Presume that the network unit is NUi. Upon receiving of this calibration message the network unit NUi transmits a predefined bit pattern PAT to the line terminator. This predefined bit pattern is for this particular embodiment chosen to be a predefined sequence of a bit with value "1" followed by a bit with value "0": i.e. 101010 . . . 101010. The sequence is chosen to be as long as to fill two preassigned timeslots on the common branch BC according to the used time division multiple access technique. Since the control network unit CTRL-NU also captures the calibration message mentioned for the network unit NUi, the control network unit CTRL-NU knows that the predefined bit pattern will be transmitted by the network unit NUi and knows which two timeslots the predefined bit pattern is going to fill on the common branch BC. The control network unit CTRL-NU uses the available information concerning the approximated switching moment of the switch SWi in order to provide a switching message to the switch SWI and in order to thereby open and to close the switch SWi so that the predefined bit pattern passes the switch SWi and the two timeslots can be used. However, it is predetermined by the calibration message that the switch SWi must only be opened and be closed in order to pass part of the transmitted predefined bit pattern i.e. in order to pass only the information meant for part of the above mentioned first timeslot and part of the above mentioned second timeslot on the common branch BC. In this way this passing part of the predefined bit pattern is passing the switch not being truncated. The first part of the predefined bit pattern i.e. the part which was meant to fill the first part of the first timeslot on the common branch BC and the last part of the predefined bit pattern i.e. the last part which was meant to fill the last part of the second timeslot on the common branch BC is truncated by the switch SWi.

For this embodiment it is preferred that the switch SWi is meant to be opened at a theoretical time moment which is defined by the middle of the first timeslot and that the switch SWi is meant to be open during a time period which equals the length of one timeslot which means that the switch SWi is meant to be closed at a theoretical time moment which is defined by the middle of the second timeslot.

It has to be remarked that other kind of implementations are as well possible. Indeed, the length of the predefined bit pattern is determined by the uncertainty on e.g. the length of the optical cable or on the value of the electrical delay and the predefined opening time period that the switch must be open. This predefined opening time period is on its term determined by e.g. the time needed by the line terminator in order to recognize a predefined bit pattern. Another possible implementation is e.g. a predefined bit pattern length of three timeslots in combination with a switch open time moment after the first timeslot and an opening time period of one timeslot whereby according to the ideal situation the predefined bit pattern is truncated during one timeslot period, not truncated for one timeslot period and again truncated during one timeslot period.

According to the preferred embodiment with a length of two timeslots, in the event when the approximated switching moment is already an accurate switching moment, a first fourth part of the predefined bit pattern is truncated, hereafter exactly half of the predefined bit pattern is not truncated and finally again a fourth part of the predefined bit pattern is truncated.

Presume that the approximated switching moment is a time moment which opens the switch SWi too late. This is shown in the FIGURE. A predefined bit pattern is shown whereof a first part is truncated (gray pattern) which is a bit longer as a fourth of the predefined bit pattern, a second part is not truncated which equals to the length of one timeslot and a third part which is a bit smaller as a fourth of the predefined bit pattern is again truncated (gray pattern). By passing through the switch SWI the predefined bit pattern PAT is truncated and a truncated bit pattern PAT-TR is provided.

The truncated bit pattern PAT-TR is combined by the optical combiner OC, according to a time division multiple access technique, with other information signals which are transmitted by other network units. The combined information signal is transmitted via the common branch BC to the line terminator LT.

The received combined information signal is examined by the detector DET in order to detect the presence of the truncated bit pattern PAT-TR. Once the truncated bit pattern is detected by the detector DET the truncated bit pattern PAT-TR is provided to the determiner DRM which determines a truncation measure TR i.e. the receiving time of the truncated part of the truncated bit pattern PAT-TR. This truncation measure TR is provided to the calculator CALC which determines in function of the truncation measure TR and the stored receiving time reference of switch SWi a calibration value CAL-SWi.

The calibration value CAL-SWi is included in the downstream distributed signals by the transmitter TRX and downstream distributed into the network.

The downstream distributed signals are captured by the control network unit CTRL-NU which extracts the calibration value CAL-SWi for the switch SWi out of the received downstream distributed signals. The control network unit CTRL-NU determines in function of the approximated switching moment APP-Ti of the switch SWi and the calibration value CAL-SWi an accurate switching moment Ti. This switching moment Ti is used for the next incoming signal INi in order to open and to close the switch SWi at the right time.

While the principles of the invention have been described above in connection with specific apparatus, it is to be clearly understood that this description is made only by way of example and not as a limitation on the scope of the invention, as defined in the appended claims.

What is claimed is:

1. A method to determine a switching moment (Ti) of a switch (SWi) which is coupled to an optical combiner (OC) of a tree-like optical network, said optical combiner (OC) being provided in order to enable multiple access of information signals (IN1, . . . , INi, . . . INn) being upstream transmitted from a plurality of network units (NU1, NU1', NU1", . . . , NUi, . . . , NUn) to a line terminator (LT) via the cascade connection of dedicated branches (B1, . . . , Bi, . . . , Bn), said optical combiner (OC) and a common branch (BC), said switch (SWi) being provided to pass one of said information signals (INi) transmitted via one of said dedicated branches (Bi) at an approximated switching moment (APP-Ti) in the event when said information signal (INi) is present and to interrupt said branch (Bi) when said information signal (INi) is not present, said method includes the steps of:

a) capturing downstream grant information by a control network unit (CTRL-NU) being coupled between said switch (SWi) and said line terminator (LT); and b) determining said approximated switching moment (APP-Ti) by said control network unit (CTRL-NU) based upon said downstream grant information, characterized in that said method further includes the steps of:

c) upstream transmitting by one of said plurality of network units (NUi) coupled to said one dedicated branch (Bi) a predefined bit pattern (PAT) similar to said information signal (INi), and in the event when said predefined bit pattern (PAT) is passing through said switch (SWi), thereby truncating said predefined bit pattern (PAT) and providing a truncated bit pattern (PAT-TR) related to said approximated switching moment (APP-Ti); and d) detecting by said line terminator (LT) reception of said truncated bit pattern (PAT-TR); and e) determining by said line terminator (LT) upon reception of said truncated bit pattern (TR-PAT) a measure of how much said predefined bit pattern (PAT) is truncated and providing thereby a truncation measure (TR); and f) calculating in function of said truncation measure (TR) a calibration value (CAL-SWI) for said switching moment (APP-Ti);

g) providing said calibration value (CAL-SWi) to said control network unit (CTRL-NU) in order to determine said switching moment (Ti) in function of said calibration value (CAL-SWi) and said approximated switching moment (APP-Ti).

2. The method according to claim 1, characterized in that said step of upstream transmitting said predefined bit pattern (PAT) is executed by said one network unit (NUi) upon receiving from said line terminator (LT) a calibration control signal.

3. The method according to claim 1, characterized in that said step e) is realized by:

determining by said line terminator (LT) upon said detection a receiving time of said truncated bit pattern (PAT-TR); and defining a receiving time reference by determining the receiving time of said truncated bit pattern (PAT-TR) at said line terminator (LT) in the event when said switch (SWi) is continuously open whereby said truncated bit pattern (PAT-TR) substantially equals to said predefined bit pattern (PAT); and that said step f) is realized by:

calculating said calibration value (CAL-SWi) in function of said receiving time and said receiving time reference.

4. A line terminator (LT) for inclusion in a tree-like optical network and adapted to be used to determine a switching moment (Ti) of a switch (SWi), said optical network including a plurality of network units (NU1, NU1', NU1", . . . , NUi, . . . , NUn) being coupled to said line terminator (LT) via the cascade connection of dedicated branches (B1, . . . , Bi, . . . , Bn), an optical combiner (OC) and a common branch (BC), said optical combiner (OC) being provided to enable multiple access of information signals (IN1, . . . , INi, . . . , INn) which are upstream transmitted from said plurality of network units (NU1, NU1', NU", . . . , NUi, . . . , NUn) to said line terminator (LT), said switch (SWi) which is coupled between one of said plurality of network units (NUi) and said optical combiner (OC) being provided to pass one of said plurality of information signals (INi) transmitted via one of said dedicated branches (Bi) at an approximated switching moment (APP-Ti) in the event when said information signal (INi) is present an to interrupt said branch (Bi) when said information signal (INi) is not present, said optical network further including a control network unit (CTRL-NU) which is coupled between said switch (SWi) and said line terminator (LT) to capture downstream grant information from said line terminator (LT) in order to determine said approximated switching moment (APP-Ti), characterized in that said line terminator (LT) includes:

detection means (DET) to detect receiving of a truncated bit pattern (PAT-TR), said truncated bit pattern (PAT-TR) being related to said approximated switching moment (APP-Ti) and being provided by passing through said optical switch (SWi) a predefined bit pattern (PAT) which is upstream transmitted by said one network unit (NUi);

determining means (DRM) coupled to said detection means (DET) to determine upon said detection a truncation measure (TR) of how much said predefined bit pattern is truncated;

calculating means (CALC) coupled to said determining means (DRM) to calculate upon receiving of said calibration measure (TR) a calibration value (CAL-SWi) in function of said truncation measure (TR) and to provide said calibration value (CAL-SWi) to transmitting means (TRX);

said transmitting means (TRX) coupled to said calculating means to transmit downstream said calibration value (CAL-SWi) to said control network unit (CTRL-NU) in order to enable said control network unit (CTRL-NU) to determine said switching moment (Ti) in function of said calibration value (CAL-SWi) and said approximated switching moment (APP-Ti).

5. The line terminator (LT) according to claim 4, characterized in that said transmitting means (TRX) is further included to transmit downstream a calibration control signal to said network unit (NUi) in order to enable said network unit (NUi) upstream transmission of said predefined bit pattern (PAT).

6. A control network unit (CTRL-NU) for inclusion in a tree-like optical network and adapted to determine a switching moment (Ti) of a switch (SWi) being coupled to said control network unit (CTRL-NU), said optical network including a plurality of network units (NU1, NU1', NU1", . . . , NUi, . . . , NUn) being coupled to a line terminator (LT) via the cascade connection of dedicated branches (B1, . . . , Bi, . . . , Bn), an optical combiner (OC) and a common branch (BC), said optical combiner (OC) being provided to enable multiple access of information signals (IN1, . . . , INi, . . . , INn) which are upstream transmitted from said plurality of network units (NU1, NU1', NU1", ..., NUi, ..., NUn) to said line terminator (LT), said switch (SWi) which is coupled between one of said plurality of network units (UNi) and said optical combiner (OC) via one of said dedicated branches (Bi), being provided to pass one of said plurality of information signals (INi) at an approximated switching moment (APP-Ti) in the event when said one information signal (INi) is present and to interrupt said one dedicated branch (Bi) when said one information signal (INi) is not present, said information signal (INi) being transmitted by said network unit (NUi) to said line terminator (LT), said control network unit (CTRL-NU) being coupled to said line terminator (LT) and including capturing means in order to capture downstream grant information from said line terminator (LT) and approximation means in order to determine said approximated switching moment (APP-Ti) based upon said captured grant information, characterized in that said control network unit (CTRL-NU) further includes:

control receiving means coupled to said line terminator (LT) to receive from said line terminator (LT) a calibration value (CAL-SWi), said calibration value (CAL-SWi) being determined by said line terminator (LT) in function of a measure of how much a predefined bit pattern (PAT) is truncated, said measure being determined upon reception of a truncated bit pattern (TR-PAT), said truncated bit pattern (PAT-TR) which is related to said approximated switching moment (APP-Ti) was truncated in the event of passing said predefined bit pattern (PAT) through said switch (SWi) at said approximated switching moment (APP-Ti), said predefined bit pattern (PAT) being similar to said information signal (INi); and control calibration means coupled between said control receiving means and said switch (SWi) to determine said switching moment (Ti) in function of said calibration value (CAL-SWi) and said approximated switching moment (APP-Ti).

7. The control network unit (CTRL-NU) according to claim 6, characterized in that said control network unit (CTRL-NU) is centralized and adopted to calibrate each one of a plurality of approximated switching moments of a plurality of switches, each one of said plurality of switches being similar to said switch (SWi) and being coupled between one of said plurality of network units (UN1, ..., UNi, ..., UNn) and said optical combiner (OC).

8. A network unit (NUi) for inclusion in a tree-like optical network and adapted to be used to determine a switching moment (Ti) of a switch (SWi), said optical network including a plurality of network units (NU1, NU1', NU1", NUi, ..., NUn) which includes said network unit (UNi) and which are coupled to a line terminator (LT) via the cascade connection of dedicated branches (B1, ..., Bi, ..., Bn), an optical combiner (OC) and a common branch (BC), said optical combiner (OC) being provided to enable multiple access of information signals (IN1, ..., INi, ..., INn) which are upstream transmitted by said plurality of network units (UN1, ..., UNi, ... UNn) to said line terminator (LT), said switch (SWi) which is coupled between said network unit (NUi) and said optical combiner (OC) being provided to pass one of said plurality of information signals (INi) transmitted via one of said dedicated branches (Bi) at an approximated switching moment (APP-Ti) in the event when said information signal is present (INi) and to interrupt said branch (Bi) in the event when said information signal (INi) is not present, said optical network further including a control network unit (CTRL-NU) which is coupled between said switch (SWi) and said line terminator (LT) to capture downstream grant information from said line terminator (LT) in order to determine said approximated switching moment (APP-Ti), characterised in that said network unit (NUi) includes:

network unit transmitting means to upstream transmit a predefined bit pattern (PAT), said predefined bit pattern (PAT) being transmitted in order to enable said line terminator (LT):

to receive a truncated bit pattern (PAT-TR), said truncated bit pattern being related to said approximated switching moment (APP-Ti) and being provided by passing through said optical switch (SWi) said predefined bit pattern (PAT); and upon receiving of said truncated bit pattern (PAT), to determine a measure (TR) of how much said predefined bit pattern is truncated; and to calculate in function of said measure (TR) a calibration value (CAL-SWi) of said approximated switching moment (APP-Ti); and to provide said calibration value (CAL-SWi) to said control network unit (CTRL-NU) in order to enable said control network unit (CTRL-NU) to determine said switching moment (Ti) in function of said calibration value (CAL-SWi) and said approximated switching moment (APP-Ti).

9. The network unit according to claim 8, characterized in that said network unit further includes network unit receiving means coupled to said network unit transmitting means to receive from said line terminator (LT) a calibration signal in order to enable said network unit transmitting means said transmission of said predefined bit pattern (PAT).

10. A tree like optical network characterized in that said tree like optical network includes any one of a line terminator (LT), a control network unit (CTRL-NU) and a network unit (NUi) according to claim 4.

* * * * *